S. M. LOCKWOOD.
Wheel-Plow.
No. 53,457.  Patented Mar. 27. 1866.
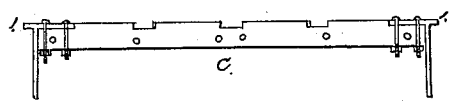
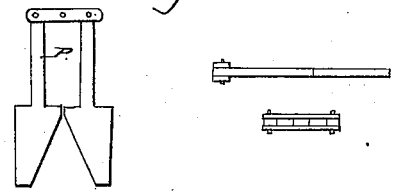
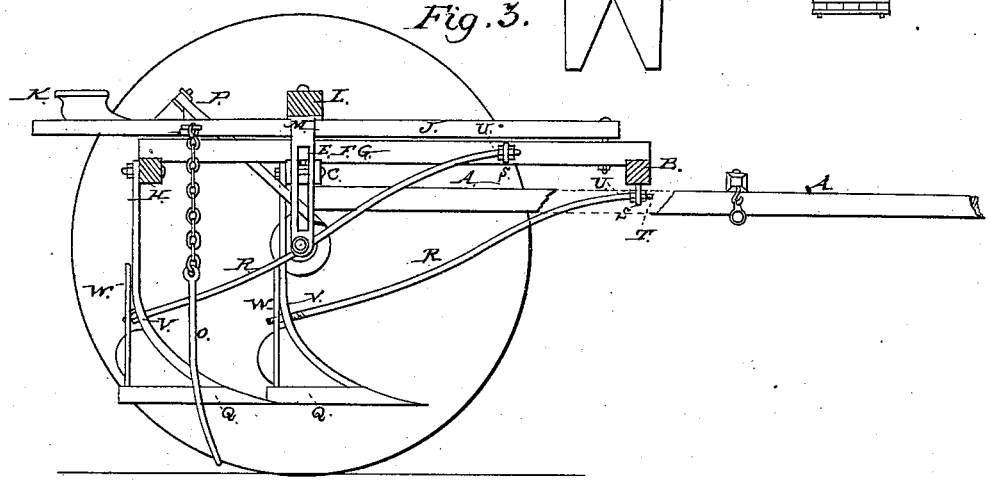
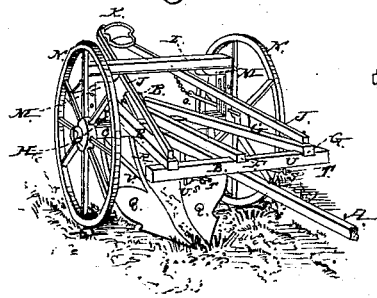
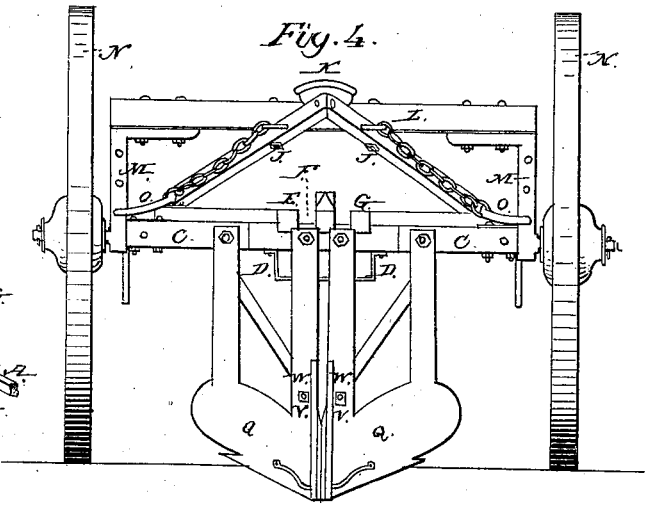

UNITED STATES PATENT OFFICE.

SAMUEL M. LOCKWOOD, OF CHICAGO, ILLINOIS.

IMPROVEMENT IN SULKY-PLOWS.

Specification forming part of Letters Patent No. 53,457, dated March 27, 1866.

*To all whom it may concern:*

Be it known that I, SAMUEL M. LOCKWOOD, of Chicago, in the county of Cook and State of Illinois, have invented a new and Improved Sulky-Plow for Plowing, and also for plowing on each side of a row of corn or potatoes at the same time, and which can also be converted into a potato-digger, as hereinafter specified; and I do hereby declare the following to be a full and true description thereof, reference being had to the accompanying drawings, and to the letters of reference marked thereon.

C at Figure 1 is a cross-bar with wrought-iron arms I and I, or its equivalent. P at Fig. 2 shows the arrangements by which the side motion, hereinafter mentioned, is obtained, with a side and back view in the same figure. Fig. 3 shows a side view of the sulky-plow with gang-plows arranged as hereinafter described, and with the plows raised, as hereinafter described. Fig. 4 shows a rear view of the arrangement of corn-plows, to be used for potato-digging. Fig. 5 shows a perspective of a sulky-plow with plows arranged for plowing on both sides of a row of corn or potatoes at the same time, the plows being down.

I construct a frame-work, as shown in Fig. 5, A being the pole, and about twelve feet long from end to end.

B is a cross-bar about three feet and ten inches long, and connected with the pole A by a swivel-bolt. C is another cross-bar, which is also shown in Fig. 1, and is about three feet and ten inches long.

D, a clamp attached to the bar C, is shown in Fig. 4, and is about one foot in length, and is attached to this cross-bar C by bolts.

E, F, and G are braces, each being about four feet six inches in length, and running from the cross-bar B, to which they are fastened by bolts, over the bar C, to which they are fastened by bolts, to cross-piece H, as shown in Fig. 5, and to which they are also fastened by bolts.

I and J are levers connected with the braces E and G and with the axle L, as shown in the drawings, by bolts, which bolts pass through slots in the levers, these slots being on the under side of the levers at E and G and on the upper side of the levers at L.

K is the seat placed across the levers, as in the drawings.

L is the axle, with the shanks M and M, which shanks are made of cast-iron or its equivalent. Each shank is made with a slot, in which the arms I and I, attached to the cross-bar C, are made to work, the piece coming down from each arm, as seen in Fig. 1, being a small rod made of wrought-iron or its equivalent, and working inside of the slots of the shanks to support the shank and prevent a racking of the plow when raised.

N and N are the wheels of the frame-work.

O and O are iron rods or bolts, or their equivalent, attached to small chains, as in Figs. 5 and 4, which chains are fastened to the levers J and J. The shanks M and M having holes, these rods or bolts are used to keep the cross-bar C down.

P is an arrangement, constructed as shown in Fig. 2, by means of which, in connection with the end of the pole A, which end comes in the clamp D and is unconfined in the clamp, the side motion hereinafter mentioned is obtained, P being attached to the raised part of the brace F at the cross-piece H by a swivel-bolt, (at Fig. 4 it is designed to show this raised part as it is at H,) and coming down each side of the pole, as shown in Fig. 5.

In Fig. 3 a side view is shown.

Q and Q are the corn-plows, and in Fig. 5 the arrangement of a right and left hand corn-plow is shown attached to the cross-bar C, for the purpose of plowing on both sides of a row at the same time and throwing the dirt from the row.

In Fig. 3 a side view of the frame is shown with plows arranged as a gang-plow, the left-hand corn-plow being left off and only two right-hand plows being used, the one placed on the cross-bar C and the other attached to the cross-piece H, which arrangement forms the gang-plow.

Fig. 4 shows two plows used in Fig. 1 placed close together on the cross-bar C to form a potato-digger.

R and R are braces, and in Fig. 3 each brace running from an eyebolt (S and S indicate the eyebolts in the cross-bar B) to the standards of the plows, these braces being rods, each rod having a thread, and made of wrought-iron or its equivalent, arranged with a nut in front of each eyebolt, T and T being the nuts, and behind each eyebolt is also a nut, U and U indicating the nuts behind the eyebolts. This is in order to point the plows, according as one may desire, in order to plow deeper or otherwise.

V and V are the nuts at the standards. In the use of the gang-plow, arranged as in Fig. 3, an eyebolt is placed in the brace F, as shown in that figure, to connect one of the braces R with the plow at H.

W and W are braces to strengthen the landside of the plows. The plows are attached to the cross-bars specified by bolts with nuts, the cross-bars having the necessary holes, so that the plows can be removed and changed when required.

When it is desired to change the plows, arranged as in Fig. 5, so as to form a plow to plow on both sides a row of corn or potatoes at the same time, and throwing the dirt in toward the row instead of out, the one on the right hand may be changed to the left-hand side and the one on the left to the right.

When a change in the direction of the plows when attached to cross-bar C is desired without changing the direction of the team, this is accomplished by the person in charge pressing with his foot on the arrangement P on the right or left hand, according as the change of direction is required, which presses against the pole, and, the pole at B being arranged with a swivel-bolt, the change is obtained.

When it is required to raise the plows from the ground, by withdrawing the pins O and O the person in the seat, by his weight operating on the levers, raises the frame-work, the pole A operating as a lever, the cross-bar C, with its arms, working up in the shanks M and M to allow of this, the plows being attached to the cross-bar or cross-bars, as before described; and when he desires to lower, it can be done by pressing with his foot on the cross-piece H.

What I claim as my invention, and desire to secure by Letters Patent, is—

1. The arrangement, substantially as described, of the part P, or its equivalent, in connection with the pole A and the clamp D, or its equivalent, substantially as above described, by means of which a change of direction is obtained, substantially as set forth.

2. The arrangement of the braces R and R, in manner substantially as set forth, with the corn-plows or their equivalent, so that the same can be pointed as one may desire, in order to plow deeper or otherwise, as one may wish.

3. The method of raising and lowering the plows by the arrangement of the levers J and J, in connection with the braces E and G, running from cross-bar to cross-bar, as above described, or their equivalent, substantially as above set forth, with the seat K, and in connection with the axle L, substantially as described, the cross-bar C, with the arms I and I, or their equivalent, in connection with the shanks M and M, substantially as set forth, and the cross-piece H, or its equivalent, substantially as set forth.

4. The arrangement of corn-plows in any and all of the ways substantially as set forth, in combination with a frame-work with wheels, and constructed substantially as set forth.

S. M. LOCKWOOD.

Witnesses:
   GEO. G. BELLOWS,
   O. P. ABERCROMBIE.